United States Patent [19]

Sirovich et al.

[11] Patent Number: 4,555,395

[45] Date of Patent: Nov. 26, 1985

[54] HYDRIDE COMPOSITIONS

[75] Inventors: Bruce E. Sirovich, Spring Valley; Robert L. Sandstrom, Chappaqua, both of N.Y.; Theo H. Fleisch, Warrenville, Ill.

[73] Assignee: Standard Oil Company, Chicago, Ill.

[21] Appl. No.: 424,608

[22] Filed: Sep. 27, 1982

[51] Int. Cl.$^4$ .......................... C01B 6/00; C01B 6/24; C01B 6/34

[52] U.S. Cl. .................. 423/644; 423/648 R; 252/188.25; 252/188.26; 420/900

[58] Field of Search ............... 252/181.1, 181.2, 181.6, 252/181.7, 181.3, 181.5, 188.25, 188.26; 423/644, 645, 648 R, 646, 647, 268; 420/900

[56] References Cited

U.S. PATENT DOCUMENTS

| | | | |
|---|---|---|---|
| 2,689,166 | 9/1954 | Rust et al. | 423/268 |
| 3,346,506 | 10/1967 | Beumel | 423/268 X |
| 3,869,544 | 3/1975 | Niles et al. | 423/645 |
| 3,919,405 | 11/1975 | Lenz et al. | 423/268 X |
| 4,302,436 | 11/1981 | Sirovich et al. | 423/648 R X |

FOREIGN PATENT DOCUMENTS

| | | | |
|---|---|---|---|
| 1043405 | 9/1966 | United Kingdom | 423/268 |
| 1383718 | 2/1975 | United Kingdom | 423/268 |

*Primary Examiner*—Teddy S. Gron
*Assistant Examiner*—Virginia B. Caress
*Attorney, Agent, or Firm*—William T. McClain; Richard A. Kretchmer; Philip Hill

[57] ABSTRACT

Disclosed are organic treating agents for imparting improved flow properties to hydrides and compositions comprising hydrides treated with an effective amount of an organic compound capable of imparting improved flow properties to said hydride. Also disclosed are methods for improving the flow properties of hydrides comprising treating said hydrides with an organic compound capable of imparting improved flow properties. Said organic treating agent can be in liquid or vapor form and comprises at least one component selected from the group consisting of aliphatic hydrocarbons, alcohols, amines, organic acids and organic acid salts.

44 Claims, No Drawings

HYDRIDE COMPOSITIONS

This invention relates to hydrides and hydride-forming materials having improved flow properties. More particularly, this invention relates to hydrides and hydride-formers capable of reversibly absorbing and desorbing hydrogen treated with various organic compounds capable of imparting improved flow properties to said hydrides. This invention also relates to methods of treating and preparing hydrides and hydride-formers having improved flow properties.

Subject matter disclosed in this application is also disclosed in commonly assigned U.S. applications Ser. No. 424,609, now abandoned, and Ser. No. 424,282, now abandoned, both of said applications are filed concurrently herewith and are expressly incorporated herein by reference.

Recently there has been considerable interest in hydrides which have the ability to chemically store large quantities of hydrogen in a concentrated form at a variety of temperatures and pressures, and then reversibly release the stored hydrogen when heat is applied to the hydride. These hydrides are substantially different from hydrides used in the reduction of various organic compounds, such as typical lithium aluminum hydrides, sodium borohydrides, etc., which irreversibly lose hydrogen. Numerous hydride-forming materials have been identified and recently various hydrides, especially metal hydrides, have received considerable attention for potential use in heat and energy conservation schemes. It should be understood that the term "hydride" is used herein to refer generally to materials capable of reversibly absorbing and desorbing hydrogen, in both the hydrogen-rich (hydrided) and hydrogen-depleted (dehydrided) states.

Materials which are most interesting include, but are not limited to, alloys, mixtures and intermetallic compounds of nickel-magnesium, lanthanum-nickel compounds, calcium-nickel, iron-titanium, iron-titanium-nickel, and titanium-nickel, as well as niobium, scandium and vanadium metal. Also suitable are hydrocarbon compounds with unsaturated carbon-carbon bonds that can accept and subsequently release hydrogen under proper conditions. Other hydride materials are disclosed in the literature, as, for example, in U.S. Pat. Nos. 4,055,962 (Terry); 4,044,819 (Cottingham); 4,039,023 (McClaine) and 3,943,719 (Terry et al.). The materials of primary interest in commercial schemes are those which are exothermic absorbers of hydrogen. For these, appreciable quantities of heat are released as the material absorbs hydrogen.

Typically, each hydride has an equilibrium temperature which is a function of hydrogen pressure. When the hydride is raised to a temperature greater than the equilibrium temperature at a given pressure and heat is further supplied, the hydride will begin to decompose, giving off previously absorbed hydrogen. The hydride will absorb hydrogen when its temperature is lowered and maintained below the characteristic equilibrium temperature of the prevailing hydrogen pressure. Conversely, lowering the hydrogen partial pressure over the hydride below the equilibrium pressure at a given temperature will cause the hydride to desorb any previously absorbed hydrogen. Accordingly, the quantity of hydrogen stored in a hydride can be varied by either of two related and roughly equivalent mechanisms: (1) adjusting the temperature of the hydride above (to desorb) or below (to absorb) the equilibrium temperature of the hydride at the prevailing hydrogen pressure; or (2) adjusting the hydrogen partial pressure over the hydride above (to absorb) or below (to desorb) the equilibrium pressure of the hydride at the prevailing temperature.

The equilibrium temperature for a given pressure is not the same for all hydride-forming materials. On the contrary, different hydrides exhibit a wide range of equilibrium temperatures for a given pressure. It is this variation that permits the use of two or more hydrides in combination in heat pumping schemes, for example. For some of the more useful hydrides, higher equilibrium temperatures are generally associated with higher hydrogen pressures.

In most process applications (heat pumps, pressure pumps, etc.) the hydrides must be repeatedly cycled through relatively large temperature excursions to effect absorption and desorption. In static bed configurations the reactor vessel containing the hydride must also be cycled. Until recently, the art did not contemplate the use of means for avoiding the thermal cycling of reactor vessels.

Such thermal cycling of major structural components has several disadvantages. Sensible heat is required to periodically heat the thermal mass of the reactor vessels. This heat is only partially recovered as the temperature of the vessel is cycled, resulting in a reduction of the thermodynamic efficiency of the process. Further, the thermal cycling of the reactor vessels will, in many cases, induce severe mechanical stress and strain which can result in accelerated mechanical failure. In addition, these reactor vessels are routinely exposed to hydrogen, and thermal cycling in the presence of hydrogen accelerates hydrogen embrittlement of many metals. Thus, hydrogen embrittlement of reactor vessels and associated maintenance problems are exacerbated.

Consequently, moved bed and moving bed hydride configurations are desirable. In this way the hydride material itself is transported between two or more reaction zones. Each reaction zone can be maintained at a desired temperature and pressure and the hydride is heated or cooled by moving it into an appropriately heated or cooled reaction zone. The thermodynamic efficiency of the cycle is improved and thermal stresses and hydrogen embrittlement of component parts of the process are reduced by reducing thermal cycling. U.S. Pat. No. 4,178,987 (Bowman et al.) and U.S. Pat. No. 3,075,361 (Lindberg) disclose such moved bed and moving bed systems.

A major obstacle to hydride usage, however, is the fact that most hydrides, and especially metal hydrides, are difficult to handle. While the processes of Bowman et al. and Lindberg can be carried out, they are hindered by the fact that most hydrides are not easily handled and transported as required by the various process applications described in these references. In fact, after repeated absorption/desorption cycles many of the more useful hydrides tend to break down and sinter into roughly 1–4 micron size particles. This sintering effect, generally coupled with a change in density and lattice structure, of the hydride, causes packing of the hydride. Most hydrides also display a strong particle-to-particle affinity, causing the hydride to agglomerate into a tightly bound mass. In fixed or static bed configurations, hydrides have been known to pack so tightly in the bottom of a reactor that lattice expansion associated with hydrogen absorption has caused distortion and bulging of even stainless steel reactors. Consequently, improvement of the troublesome handling characteristics of most useful hydrides is considered essential to such applications. Even in fixed bed applications, it would be advantageous to overcome the packing tendency to avoid destruction of structural components or reactors now caused by lattice expansion associated with hydrogen absorption.

Conventional fluidizing or slurry agents have generally proven ineffective, however. Our efforts with lubricating powders and fillers such as "cab-o-sil," fumed silica, molybdenum disulfide, graphite powders and active carbon have yielded results ranging from poisoning of the hydride, to no enhanced properties, to enhancement of the flow characteristics of hydrides for only a short time (about 8 hours) before degradation and agglomeration reoccurred in both stirred and agitated beds. Accordingly, there is a need for techniques for treating hydrides to render them easier to handle, and preferably, free-flowing.

Generally, however, the art takes great pains to avoid contacting most hydrides, especially metal hydrides, with virtually all chemicals. Some hydrides are quite easily poisoned or rendered inactive by contact with numerous common substances, such as $H_2O$ and air. Dry boxes and special handling techniques in an inert atmosphere are common precautions typically employed when handling or using hydrides.

The general object of this invention is to improve the handling properties of solid particulate hydrides. A more specific object of this invention is to provide hydride compositions which are relatively free-flowing solids. A further object of this invention is to provide hydride compositions which have reduced tendency to pack and agglomerate in use. Another object of this invention is to provide a method of improving the flow properties of hydrides without substantially altering the ability of the hydride to reversibly absorb and desorb hydrogen. Other objects appear hereinafter.

SUMMARY OF THE INVENTION

It has been discovered that certain organic compounds are effective treating agents for improving the handling characteristics of hydrides. In general, we have now found that the objects of this invention are achieved by the composition resulting from the treatment of hydrides and hydride formers with various organic treating agents. Thus, the objects of this invention are achieved by a composition capable of reversibly absorbing and desorbing hydrogen comprising a hydride treated with an effective amount of an organic compound capable of imparting improved flow properties to said hydride. Said organic compound comprises at least one compound selected from the group consisting of aliphatic hydrocarbons, alcohols, amines, organic acids, and organic acid salts. For purposes hereof, compounds or compositions which impart improved flow properties are deemed to be those which have the beneficial effect of reducing the tendency of the hydride to stick together, pack or agglomerate, while maintaining the hydride's absorption/desorption characteristics. Preferred treating agents improve the flow properties of a hydride without substantially effecting the hydride's ability to reversibly absorb and desorb hydrogen.

The objects of the present invention are also attained by a method for improving flow properties of a hydride comprising treating said hydride with an effective amount of an organic composition capable of imparting improved flow properties to said hydride without substantially altering said hydride's ability to reversibly absorb and desorb hydrogen.

In another aspect, the present invention is a method for improving flow properties of a hydride comprising treating said hydride with an effective amount of a liquid organic composition capable of imparting improved flow properties to said hydride without substantially altering the hydride's ability to reversibly absorb and desorb hydrogen.

In still another aspect, the present invention is a method for improving the flow properties of a hydride comprising treating said hydride with an effective amount of a gaseous organic composition capable of imparting improved flow properties to said hydride without substantially altering the hydride's ability to reversibly absorb and desorb hydrogen.

Briefly, the method of the present invention can be carried out by contacting an excess amount of a suitable organic treating agent in either liquid or vapor form with a hydride, removing any excess treating agent and reactivating the hydride by successive absorption/desorption cycles. Preferably, treatment with liquid organic treating agents is begun with the hydride in a substantially hydrided state; gaseous treatments are preferably begun with the hydride in a substantially dehydrided state. Both aqueous and non-aqueous treatments have proven effective in achieving a composition with substantially improved flow characteristics without substantially altering the hydride's capability to reversibly absorb and desorb hydrogen. We have determined that satisfactory treatments comprise polar organic compositions having at least 2 carbon atoms, and preferably comprise alcohols, organic acids and organic acid salts having at least 2 carbon atoms.

While we do not wish to be bound by any theory, it appears that certain organic compounds tend to chemically change the outer crystal layer of the hydrides in such manner that the hydride particles tend to repulse each other. The particles are thereby rendered much more free-flowing and less prone to pack or agglomerate during handling.

We believe that our composition and process are surprising because metal hydrides are normally formed from a metal melt and then used in a dry box or under substantially sterile conditions to prevent poisoning from contact with deleterious substances. It is generally recognized in this art that hydrides, and particularly metal hydrides, are susceptible to poisoning by various gases, such as air and oxygen, and numerous other common materials, such as water. Accordingly, the art has taken great pains to isolate metal hydrides from virtually all chemicals to avoid poisoning. We have found, however, that numerous organic compounds are efficacious in improving the handling properties of metal hydrides. In some cases, treated hydrides also possess enhanced kinetic properties and poison resistance.

DETAILED DESCRIPTION

The general selection criteria for effective treating agent compositions are that the material be substantially porous to hydrogen, that it not interfere substantially with hydrogen dissociation on the surface of the hydride, that it adhere to the surface of the hydride, that it be relatively durable, and that it not adhere to itself. It is important to note that satisfactory treating agents are considered to be only those which overcome the sticking and agglomerating tendency of most hydrides without substantially affecting the absorption and desorption characteristics of the hydride. More particularly, the hydrogen capacity of the hydride and the kinetics of the absorption process are unaffected by the ideal treating agent.

Studies of the surfaces of metal hydrides have shown that contaminants, especially $O_2$ and $H_2O$, usually induce surface segregation of the hydride components. For example, in $LaNi_5$ (a representative hydride species) the La is predominantly present on the surface as $La_2O_3$ or $La(OH)_3$, and the Ni is usually present in metal form. Our studies of the surface of treated $LaNi_5$ indicate that effective treating agents are adsorbed at the surface of the hydride. It is believed that aliphatic organic acids, for example, are adsorbed at the Ni site on the hydride surface over their hydroxyl oxygen—with an aliphatic or aromatic group "sticking up." Consequently one possible interpretation for the improved flow properties resulting from treatment in accord with this invention is a repulsive interaction between aliphatic or like groups associated with treating-agent molecules adsorbed on neighboring hydride particles—thus preventing close contact and the usual packing, clinging or agglomerating phenomenon.

While we do not intend to be bound by this theory, it can be noted that this interpretation implies that compositions comprising polar organic molecules capable of adsorbing on metal surfaces are candidates as treating agents. Repulsive interaction is provided by aliphatic or aromatic groups protruding from adjacent hydride particles. Molecules containing hetero-atoms, such as oxygen and nitrogen, have indeed proven to be very effective. Treatment with nonpolar molecules is expected to be less desirable, and our experiments have shown that n-hexane is, in fact, less effective than other polar molecules. Although our surface studies indicated formic acid was adsorbed as well as other acids, formic acid was not an effective treatment. If repulsion between aliphatic or aromatic groups is a partial explanation of the beneficial handling features imparted by certain organic compounds, the failure of formic acid as a treating agent can be understood by observing that formic acid possesses no aliphatic or aromatic group.

In general, suitable hydrides for use in accord with the present invention are alloys, mixtures and intermetallic compounds containing alkaline earth metals or elements selected from Groups IIA, IIIA, IVB, VB, VIB, VIIB and VIII of the Periodic Table of Elements which are capable of reversibly absorbing and desorbing hydrogen. Examples of suitable hydrides include magnesium-nickel, lanthanum-nickel, calcium-nickel, iron-titanium, iron-titanium-nickel, and titanium-nickel, as well as niobium, scandium and vanadium metals. Preferred hydrides have at least one Group VIII constituent and of these, most preferred are calcium-nickel, lanthanum-nickel and iron-titanium compounds.

Suitable organic compositions useful as treating agents in accord with the present invention are aliphatic hydrocarbons, alcohols, amines, organic acids, organic acid salts and combinations thereof capable of improving the flow properties of a hydride without substantially altering the hydride's ability to absorb and desorb hydrogen.

Suitable aliphatic hydrocarbons generally contain 1 to 18 carbon atoms and include alkanes, such as ethane, propane, butane, hexane, methyl pentane, 2-ethylhexane, octadecane, etc., olefins having 2 to 18 carbon atoms such as 1-hexene, isobutene, cyclopentane, 1,3-butadiene, etc. Preferred aliphatic hydrocarbons are alkanes and olefins having 2 to 8 carbon atoms and, of these, most preferred are hexane and butadiene.

Suitable alcohols generally contain 1 to 18 carbon atoms, such as methanol, ethanol, propanol, butanol, octanol, isopropanol, ethylene glycol, and glycerol. Preferred alcohols have 2 to 10 carbon atoms and, of these, most preferred are alcohols having 3 to 8 carbon atoms, such as propanol and octanol.

Suitable amines generally contain 1 to 18 carbon atoms and include primary and secondary aliphatic amines, such as monomethylamine, dimethylamine, ethylamine, diethylamine, octylamine and isobutylamine. Preferred amines have 1 to 8 carbon atoms, such as monomethylamine, dimethylamine and octylamine.

Suitable organic acids and organic acid salts generally contain 2 to 18 carbon atoms and include uric acid, carboxylic acids, such as acetic, propionic, butyric, benzoic, oxalic, malonic, succinic, maleic, phthalic, isophthalic, terephthalic, phenylacetic, hydroxyisobutyric, and glycolic, and salts thereof. Preferred organic acids and organic acid salts are carboxylic acids having 2 to 8 carbon atoms, such as acetic, propionic, butyric, benzoic, malonic, and glycolic, and salts thereof containing $NH_4$, Na, K, La, etc. Of these, most preferred are acetic acid and ammonium acetate.

While tests indicate that under some conditions compositions containing a single carbon atom are capable of improving the handling characteristics of hydrides, enhancement of these properties increases when the organic composition contains two or more carbon atoms. For example, acetic acid and acetic acid salts, which are preferred treating agents in accord with the present invention, are substantially more effective than formic acid. Likewise, octanol, a preferred treating agent, is substantially more effective than methanol. Accordingly, in general, the most efficacious treating agent contains at least two carbon atoms. In addition, alcohols having at least 3 carbon atoms are generally more effective than lower carbon alcohols.

Further, while substantially any organic acid or salt thereof can be used to treat hydrides, certain precautions must be employed. For example, if the hydride-former contains an alkaline earth metal constituent, treatment with aqueous compositions of the organic treating agent in water are generally less satisfactory than if a water-free treating composition is employed. For example, aqueous acetic acid solutions are substantially ineffective in improving the flow properties of $CaNi_5$, whereas treatment with substantially anhydrous acetic acid (99% glacial) in methanol is fully satisfactory. This is believed to be attributable to competing $H_2O$ adsorption. Further, other things being equal, treatment of $CaNi_5$ with only methanol is much less efficacious than treatment with substantially anhydrous acetic acid in methanol.

Our experiments have also shown a rough relationship between the pH of the treated hydride solution and the flow-improving effects of the treatment. In general, successful treatments result in hydride compositions having a pH under about 7.0 and preferably, the pH of the treated hydride is adjusted by addition of more treating agent to be between about 3.0 and about 5.0. It is believed that a hydroxylation reaction takes place at pH values above about 7.0, leading to a surface hydroxide which hampers the adsorption of the organic treating agent. In addition, it is known that powder particles covered with hydroxides tend to stick together due to an OH interaction over H bridge bonding.

The efficacious treatment of FeTi with methanol, propanol, dimethylamine (in vapor phase) and a solution of 3% by weight acetic acid in $H_2O$ was surprising and noteworthy. This hydride is notoriously easy to poison and is known in the art to be difficult to reactivate after poisoning. The art typically takes extraordinary measures to avoid contacting FeTi with virtually all non-inert substances, including air. Accordingly, the treating agents we have found to be effective would typically be considered to be poisons of FeTi, rather than agents imparting a beneficial effect. More importantly, after treatment with a 3% acetic acid solution, the FeTi was easily reactivated and found to have enhanced capacity and improved kinetics. Even more surprising was the fact that FeTi treated with a 3% acetic acid solution easily reactivated after exposure to air. Thus, treated FeTi exhibited enhanced kinetic properties and poison resistance, in addition to enhanced flow properties.

Organic compositions useful as treating agents in this invention can be contacted with suitable hydrides under a variety of conditions. Contact can be carried out with the treating agents in a substantially pure state. Alternatively, suitable organic compositions can be dissolved or suspended in carrier liquids such as $H_2O$ and polar organic solvents (e.g., methanol), or used in vapor state. As explained below, vapor phase treatment is useful for treating hydrides without the need for $H_2O$ or other carrier diluents. In liquid phase treatments, the organic treating agent can comprise about 1% to about 100% by weight of the treating agent solution. In those cases wherein a solvent or diluent is employed, the treating agent preferably comprises about 1% to about 5% by weight of the treating agent solution. Further, substantially anhydrous treatments are typically more satisfactory than treatments employing aqueous solutions. However, by routine experimentation in accord with the treatment methods described herein, it is possible to determine optimum treatments for specific hydrides.

In general, the method of treating the hydrides with suitable organic treating agents in accord with the present invention involves contacting an effective amount of an organic treating agent selected in accord with the discussion hereinabove with an activated hydride, removing any excess treating agent and cycling the hydride through at least one absorption/desorption cycle. As the art recognizes, a hydride becomes "activated" after it is subjected to a series of absorption/desorption cycles which initially force the hydride to successively absorb and release hydrogen.

For purposes hereof, an effective amount of the organic composition useful as a treating agent is considered to be an amount sufficient to materially enhance the flow properties of a given hydride. It is expected that maximum enhancement is derived from amounts of treating agent sufficient to form a monolayer coating on each hydride particle. For purposes hereof, a monolayer is considered to be a coating of the treating agent about one treating-agent-molecule in depth. It is to be understood, however, that material enhancements of flow properties can be realized from the application of less than a mono-layer of treating agent. It is expected that lesser amounts of treating agent will result in varying improvements in flow properties depending upon the composition, hydrogen inventory, cycling history, density, particle size and kinetics of the particular hydride involved. Preferably, a substantial excess (e.g., enough to completely cover the hydride in liquid phase treatments) is employed to ensure effective contact between each hydride particle and the treating agent. In this respect, stirring or agitation of the hydride during contact can be advantageous. Optimum effective amounts of treating agent for particular applications and particular hydrides can be determined by routine experimentation.

Our tests have indicated that it is desirable to remove excess treating agent prior to reactivation of the hydride. One method of removing excess liquid treating agent is to heat the hydride and treating agent solution to a temperature above about the boiling point of the agent. Care should be taken, however, to avoid temperatures at which the hydride begins to disproportionate. This is not a major problem, however, as most hydrides begin to disproportionate at temperatures well above the boiling point of most suitable treating agents. Other means of avoiding excess treating agent will be apparent to those skilled in the art.

In some cases, especially after gaseous treatments, the treated hydride did not immediately exhibit improved flow properties. For example, more than one treatment was necessary for FeTi treated with dimethylamine, and $LaNi_5$ treated with 1,3-butadiene, monomethylamine, and dimethylamine also required more than one treatment. Surprisingly, two treatments of $LaNi_5$ with trimethylamine, however, yielded negative results. In addition, FeTi treated with 2% to 3% acetic acid in $H_2O$ did not exhibit substantially improved flow properties until after the treated FeTi was crushed with a mortar and pestle. While the need for multiple treatments and physical manipulation in certain cases is not fully understood, optimum repetitions and physical handling can be determined by routine experimentation.

In some cases, a solvent was used to disperse and dilute liquid treating agents to aid in carrying the agents to the hydride surface. For example, both acetic acid in $H_2O$ and acetic acid in methanol were found to be effective. In such cases, the solvent and excess agent can be driven off by elevating the temperature of the treated hydride and pumping the system out for an extended period.

Preferably, liquid phase treatments are begun with the hydride in a substantially hydrided (hydrogenrich) state. Our tests indicated that the treated hydride was easier to reactivate when the liquid treatment was carried out with the hydride initially possessing an appreciable internal inventory of absorbed hydrogen. It is understood that the term liquid treatments is intended to include treatments wherein the treating agent solution comprises a neat or substantially undiluted fluid organic treating agent, as well as treatments wherein the organic treating agent is dissolved, suspended or fluidized in a solvent, diluent or carrier fluid.

Vapor phase treatments have also been useful in imparting desirable flow properties to hydrides. This method has the advantage of carrying the treating agent to the hydride surface without needing a solvent or carrier. The treatment method is thereby simplified and made less energy intensive. In this embodiment, the hydride is heated to a temperature above the boiling point, but below the critical point, of the treating agent. Care should also be taken to carry out the process without causing disproportionation of the hydride. The treating agent is then introduced in vapor state and exposed to the hydride. The vaporized treating agent diffuses through the bed, coating the hydride particles with a layer of adsorbed treating agent.

As elevated temperatures (e.g., 100°–400° C.) are necessary for vapor treatment, such treatment is preferably begun with the hydride in a substantially dehydrided (hydrogen-depleted) state. Depleting the hydride first avoids the possibility that hydrogen desorption taking place at the elevated temperatures will interfere or compete with adsorption of the treating agent vapor. While reactivation after such vapor treatment was not a major problem, as noted previously, more than one vapor treatment was typically necessary.

The ability to treat in vapor phase leads to certain advantages in normal use. A single reactor can be used both for activating the hydride and for treating the hydride. The hydride is simply activated in the normal manner and thereafter the treating agent is introduced into the hydrogen background during cycling. Alternatively, the hydrogen can be pumped out first and the treating agent vapor then introduced.

In commercial moved or moving bed continuous process applications, a small inventory of the treating agent vapor can be maintained in the hydrogen (or other gas) background in which the hydride is cycled. This continuous treating agent inventory can compensate for any attrition of absorbed hydrogen and also serve to re-treat any hydride losing its flow properties due to the rigors of the process involved.

Once the natural sticking tendency of the hydride has been overcome by treatment in accord with the present invention, treated hydrides were observed to exhibit an interesting "self-fluidizing" effect. While it is understood that virtually any fluidizing agent or medium not poisonous to the hydride can be employed subsequent to treatment, it is not necessary to employ such an additional agent or medium. If the treated material exists in sufficiently small particles and is not mechanically or otherwise bound together, the release of hydrogen from the internal inventory of absorbed hydrogen results in a buoying effect which causes the particles to separate and, lubricated by the intervening cushion of hydrogen gas, behave like a liquid. Thus, we observed the evolution of hydrogen from the hydride itself was sufficient to cause completely fluid behavior—the evolved hydrogen functioned as the fluidizing agent. So long as heat was applied to promote continued hydrogen desorption (or equivalently, the partial pressure of hydrogen over the bed was lowered below the hydride's equilibrium pressure), the best performing treated hydrides bubbled and percolated all across their surfaces. The self-percolating bed offered little resistance to stirring with a spoon, poured like a liquid, and sought its own level in a "U" tube. Ripples and wave patterns were observed across the hydride suface when a stainless steel ball was dropped into the bed.

Upon depletion of the hydrogen reservoir in the hydride, or when the mechanism promoting hydrogen desorption (i.e., heat or reduced $H_2O$ pressure) was turned off, the hydride bed returned to a stable, packed, solid form. Thus, as evolved hydrogen was the fluidizing mechanism, the fluid behavior of a treated hydrogen-rich hydride was completely controlled by external means—the application or cessation of heat, or contact with high or low pressure $H_2$. Clearly, the preferred fluidizing medium is hydrogen gas, but it is expected that other agents, especially certain liquids and gases (such as argon and nitrogen) are equally useful. Determination of additional useful fluidizing mediums for hydride compositions in accord with the present invention will be readily apparent to one skilled in the art.

EXAMPLE I

An excess of demineralized $H_20$ was mixed with $LaNi_5$ hydride in a pressure reactor. After stirring, all excess $H_2O$ was boiled away and the material was run through several absorption/desorption cycles at room temperature involving absorptions at high $H_2$ pressure (about several hundred psia) and desorption at low $H_2$ pressure (a few psia). The $LaNi_5$ was observed to reactivate easily. No improvement in flow properties was evident.

EXAMPLE II

To facilitate investigation of the phenomenon and to determine the range of treating agents which would impart beneficial handling properties to various hydrides, both liquid and vapor treatments were developed and standardized:

Liquid treatment

A representative sample (about 250 mg) of the selected hydride was activated in a pressure vessel reactor by cycling 5 to 6 times at ambient temperatures between about 500 psia and near vacuum (about 5 psia, all such reported pressures refer to hydrogen partial pressure unless otherwise indicated). With the hydride in a hydrogen-rich state, the $H_2$ was vented to atmosphere and the reactor lid opened.

For non-aqueous liquid treatments, about 70 ml of the treating agent solution was stirred thoroughly into the hydride.

For aqueous treatments, approximately 70 ml of demineralized $H_2O$ was stirred thoroughly into the hydride. Then, about 40 ml of a 1% to 3% by weight solution of treating agent in demineralized $H_2O$ were stirred thoroughly into the reactor until the hydride was entirely covered. Preferably, additional treating agent solution was then added as needed to bring the pH of the mixture in the reactor to about 3.0 to 3.5.

For both aqueous and non-aqueous treatments, excess liquid was spooned off the hydride and then blotted with paper toweling from the hydride. The hydride was then stirred into loose particles.

The reactor was closed and the hydride was cycled between about 500 psia and near vacuum for about 10 to 15 cycles while heating to a temperature above the boiling point of the treating agent or treating agent/-$H_2O$ solution.

The hydride was then allowed to cool under 500 psia hydrogen. At room temperature, the hydride was reactivated by cycling between about 500 psia and near vacuum for 2 to 3 cycles. After reactivation, the reactor was placed under an argon atmosphere in a glove box, the $H_2$ was vented and the reactor was opened quickly. The behavior of the treated hydride was then observed.

Vapor treatment

A representative sample (about 250 mg) of the selected sample was activated by cycling between about 500 psia and near vacuum for 5 to 6 cycles. The pressure in the reactor was reduced to 650 microns with a vacuum pump and maintained there for between 3 and 4.5 hours to remove substantially all hydrogen from the hydride. (The more rapid depletion of the hydride was achieved by simultaneously heating the hydride to about 60° C.) At room temperature, the gaseous treating agent was released into the reactor and heated to about 40° C. The gas was allowed to diffuse through and cover the hydride for 30 to 40 minutes. Hydrogen gas was then introduced at about 60 psia. After thermal equilibrium was reached, further absorption was promoted by adding more $H_2$ at about 500 psia. The reactor was allowed to cool to room temperature and then reactivated by cycling between about 500 psia and near vacuum for 2 to 3 cycles. The $H_2$ was then vented under argon atmosphere in a glove box, the reactor opened and the hydride observed.

A sample of $LaNi_5$ was treated in accord with the liquid treatment described above. The reactor lid was opened when the internal pressure diminished to about 1 atmosphere. As the treated $LaNi_5$ was in a hydrogen-rich state, it discharged hydrogen as it derived heat from the sensible heat of the still-warm reactor walls. The treated hydride flowed and behaved much like water. As the hydride bed cooled, the "fluid" behavior diminished. Heating the bed further caused the fluid behavior to return. The surface bubbled and percolated from the evolving hydrogen. Stirring with a stainless steel spoon met little resistance. The "self-fluidizing" material sought its own level when tilted or placed in "U" tube and poured like a liquid. A stainless steel ball bearing was dropped into the percolating bed, causing a splash with ripples and wave patterns. As the bed cooled, the physical bulk of the material appeared to decrease and, though still somewhat fluid-like, the material became more viscous. When hydrogen desorption ceased, the treated $LaNi_5$ compacted back into a solid mass.

Table I contains the results of treatments of $CaNi_5$, FeTi and $LaNi_5$ using various organic acids, inorganic acids, aliphatic hydrocarbons, alcohols, amines, and salts of organic acids as candidate flow improvers. Liquid treatments are denoted "L," while vapor treatments are denoted "V"; aqueous treatments are denoted "A," and non-aqueous treatments are denoted "NA". All percentages recited in Table I refer to by-weight concentrations of candidate treating agent in demineralized $H_2O$ unless otherwise indicated.

In addition, a subjective evaluation of the relative effectiveness of each treatment has been included in Table I as follows:

1—Best result: treated hydride poured easily; very fluffy; percolated across entire bed surface; rippled and splashed much like water.
2—Good result: treated hydride was fluid-like, more viscous than water; percolated across most of surface; rippled slightly.
3—Fair result: treated hydride still fluid-like but very viscous; very little percolation; ripples barely visible, damped quickly.
—NI- Treated hydride exhibited no improvement in flow characteristics: no fluid behavior; no bubbles.

It should be noted that FeTi treated with 3% by weight acetic acid in $H_2O$ exhibited improved flow properties only after the treated hydride particles were manually crushed with a mortar and pestle. Further, all vapor treatments were performed twice, although $LaNi_5$ treated twice with butene and $LaNi_5$ treated twice with trimethylamine showed no improvement.

TABLE I

| Hydride | Candidate Treating Agent | Treatment | Effect | pH |
|---|---|---|---|---|
| $CaNi_5$ | 3% acetic acid | L/A | NI | 9-9.5 |
| | 10% acetic acid | L/A | NI | 10.5-11.5 |
| | methanol | L/NA | NI | 8.0-8.5 |
| | 4% NaOH | L/A | NI | 11.5-12.5 |
| | 3% acetic acid in methanol | L/NA | 2 | 4.5-5.0 |
| | octanol | L/NA | 1 | (not measured) |
| FeTi | 3% acetic acid | L/A | 2 | 3.0-3.5 |
| | methanol | L/NA | 1 | (not measured) |
| | propanol | L/NA | 1 | (not measured) |
| | dimethylamine | V | 1 | (not measured) |
| $LaNi_5$ | 3% acetic acid | L/A | 1 | 3.0-3.5 |
| | 3% propionic acid | L/A | 1 | 3.0-3.5 |
| | 3% butyric acid | L/A | 1 | 3.0-3.5 |
| | octanol | L/A | 1 | (not measured) |
| | octanol | L/NA | 1 | (not measured) |
| | propanol | L/NA | 1-2 | (not measured) |
| | 1,3-butadiene | V | 1-2 | (not measured) |
| | 3% benzoic acid | L/A | 2 | 4.0-4.5 |
| | 3% malonic acid | L/A | 2 | 4.0-5.0 |
| | 1.5% glycolic acid | L/A | 2 | 3.0-3.5 |
| | ethanol | L/NA | 2 | (not measured) |
| $LaNi_5$ | n-hexane | L/NA | 2 | (not measured) |
| | 3% ammonium acetate | L/A | 2 | 4.0-4.5 |
| | 3% uric acid | L/A | 2 | 4.5-5.0 |
| | methanol | L/NA | 3 | 3.5-4.0 |
| | octylamine | L/NA | 3 | (not measured) |
| | monomethylamine | V | 3 | (not measured) |
| | dimethylamine | V | 3 | (not measured) |
| | trimethylamine | V | NI | (not measured) |
| | 3% HCl | L/A | NI | 3.0-3.5 |
| | 3% $HNO_3$ | L/A | NI | 3.0-3.5 |
| | 3% formic acid | L/A | NI | 3.0-3.5 |
| | 3% phenol | L/A | NI | 7.2-7.6 |
| | 3% aniline | L/A | NI | 7.2-7.6 |
| | 3% nickel acetate | L/A | NI | 6.4-6.8 |
| | 3% p-toluene sulfonic acid | L/A | NI | 3.0-4.0 |
| | butene | V | NI | (not measured) |

We claim:

1. A composition capable of reversibly absorbing and desorbing hydrogen comprising a metal hydride treated with an effective amount of an organic compound capable of imparting improved flow properties to said hydride without substantially altering said hydride's ability to reversibly absorb and desorb hydrogen, said hydride being an alloy, a mixture, or an intermetallic compound each consisting essentially of metals consisting of elements of Groups IIA, IIIA, IVB, VB, VIB, VIIB, and VIII of the Periodic Table of Elements and being capable of reversibly absorbing and desorbing hydrogen, said composition having been prepared by the method which comprises: (a) treating said hydride with an effective amount of an organic composition capable of imparting improved flow properties to said hydride without substantially altering said hydride's ability to reversibly absorb and desorb hydrogen, said organic composition being in a liquid or vapor form and being at least one compound selected from the group consisting of aliphatic hydrocarbons containing 1 to 18 carbon atoms, alcohols containing 1 to 18 carbon atoms, amines containing 1 to 18 carbon atoms, organic acids and organic acid salts containing 2 to 18 carbon atoms, and combinations thereof; (b) removing substantially all functionally excessive organic composition; and (c) cycling said hydride through one or more absorption/desorption cycles between about 5 psia and about 500 psia of hydrogen at a temperature above the boiling point of said organic composition.

2. The composition of claim 1, wherein said organic compound capable of imparting improved flow properties to said hydride comprises at least one compound selected from the group having 2 to 18 carbon atoms consisting of alcohols, organic acids, and organic acid salts.

3. The composition of claim 1, wherein said hydride comprises at least one Group VIII element.

4. The composition of claim 2, wherein said composition has been prepared by treating said hydride with a liquid organic compound to provide a treated hydride solution comprising said hydride and said liquid organic compound and wherein said hydride solution has a pH value less than about 7.

5. The composition of claim 3, wherein said organic compound comprises at least one compound selected from the group consisting of primary and secondary amines having 1 to 18 carbon atoms.

6. The composition of claim 3, wherein said organic compound comprises an aliphatic hydrocarbon and said hydrocarbon comprises at least one compound selected from the group consisting of alkanes and olefins having 2 to 18 carbon atoms.

7. The composition of claim 3, wherein said organic compound comprises at least one compound selected from the group consisting of alcohols having 2 to 10 carbon atoms.

8. The composition of claim 3, wherein said organic compound comprises at least one compound selected from the group consisting of organic acids and organic acid salts having 2 to 18 carbon atoms.

9. The composition of claim 4, wherein said hydride solution has a pH value between about 3 and about 5.

10. The composition of claim 5, wherein said hydride comprises at least one compound selected from the group consisting of Fe Ti hydride and La $Ni_5$ hydride, said amines have 1 to 8 carbon atoms and said composition has been prepared by treating said hydride with a liquid organic compound to provide a treated hydride solution comprising said hydride and said liquid organic compound and wherein said hydride solution has a pH below about 7.

11. The composition of claim 6, wherein said hydride is $LaNi_5$ hydride.

12. The composition of claim 7, wherein said hydride comprises at least one compound selected from the group consisting of $CaNi_5$ hydride, said alcohols have 3 to 8 carbon atoms, and said composition has been prepared by treating said hydride with a liquid organic compound to provide a treated hydride solution comprising said hydride and said liquid organic compound and wherein said hydride solution has a pH below about 7.

13. The composition of claim 3, wherein said hydride comprises at least one compound selected from the group consisting of $CaNi_5$ hydride, FeTi hydride, and $LaNi_5$ hydride, said organic acids and organic acid salts have 2 to 8 carbon atoms, and said composition has been prepared by treating said hydride with a liquid organic compound to provide a treated hydride solution comprising said hydride and said liquid organic compound and wherein said hydride solution has a pH below about 7.

14. A method for improving the flow properties of a metal hydride, said hydride being an alloy, a mixture, or an intermetallic compound, each consisting essentially of metals selected from the group consisting of elements of Groups IIA, IIIA, IVB, VB, VIB, VIIB, and VIII of the Periodic Table of Elements and being capable of reversibly absorbing and desorbing hydrogen, which method comprises: (a) treating said hydride with an effective amount of an organic composition capable of imparting improved flow properties to said hydride without substantially altering said hydride's ability to reversibly absorb and desorb hydrogen, said organic composition being in a liquid or vapor form and being at least one compound selected from the group consisting of aliphatic hydrocarbons containing 1 to 18 carbon atoms, alcohols containing 1 to 18 carbon atoms, amines containing 1 to 18 carbon atoms, organic acids and organic acid salts containing 2 to 18 carbon atoms, and combinations thereof; (b) removing substantially all excess organic composition; and (c) cycling said hydride through one or more absorption/desorption cycles between about 5 psia and about 500 psia of hydrogen at a temperature above the boiling point of said organic composition.

15. The method of claim 14, wherein said organic composition is a liquid organic composition and wherein said treating is begun with said hydride in a substantially hydrided state.

16. The method of claim 14, wherein said organic composition is a gaseous organic composition and wherein said treating is begun with said hydride being in a substantially dehydrided state.

17. The method of claim 14, wherein said organic composition is a gaseous organic composition and said hydride is used in a continuous process with a gaseous background in which it is cycled to alternately absorb and desorb hydrogen, and an inventory of said gaseous organic composition capable of imparting improved flow properties is maintained in said gaseous background.

18. The method of claim 14, wherein said organic composition comprises at least one aliphatic hydrocarbon selected from the group consisting of alkanes and olefins having 2 to 18 carbon atoms.

19. The method of claim 14, wherein said organic composition comprises at least one compound selected from the group consisting of alcohols having 2 to 10 carbon atoms.

20. The method of claim 14, wherein said organic composition comprises at least one compound selected from the group consisting of organic acids and organic acid salts having 2 to 18 carbon atoms.

21. The method of claim 14, wherein said organic composition comprises at least one compound selected from the group consisting of alcohols, organic acids, and organic acid salts and having at least 2 carbon atoms.

22. The method of claim 14, wherein said method further comprises treating said activated hydride in a substantially hydrided state with a liquid organic composition capable of imparting improved flow properties to said hydride in an amount approximately sufficient to form a mono-layer coating of said compound on each particle of said hydride and thereafter cycling said hydride through at least one absorption/desorption cycle.

23. The method of claim 15, wherein said hydride is LaNi$_5$ hydride, organic composition comprises at least one compound selected from the group consisting of alcohols having 3 to 8 carbon atoms and carboxylic acids having 2 to 8 carbon atoms, and wherein said treating of said hydride provides a treated hydride solution comprising said hydride and said organic composition and wherein the pH of said hydride solution is between about 3 and about 5.

24. The method of claim 15, wherein said hydride is FeTi hydride, said liquid organic composition comprises at least one compound selected from the group consisting of alcohols having 1 to 18 carbon atoms and carboxylic acids having 2 to 8 carbon atoms, and wherein the treating of said hydride provides a treated hydride solution comprising said hydride and said liquid organic composition and wherein the pH of said hydride solution is between about 3 and about 5.

25. The method of claim 15, wherein said hydride is LaNi$_5$ hydride, said liquid organic composition comprises at least one compound selected from the group consisting of carboxylic acids having 2 to 8 carbon atoms, alcohols having 3 to 8 carbon atoms and olefins having 2 to 8 carbon atoms, and wherein said treating of said hydride provides a treated hydride solution comprising said hydride and said liquid organic composition and wherein the pH of said hydride solution is between about 3 and about, 5.

26. The product of the method of claim 15.

27. The method of claim 16, wherein said treating is performed at a temperature above about the boiling point and below about the critical point of said organic composition, said hydride comprises at least one compound selected from the group consisting of FeTi hydride and LaNi$_5$ hydride, and wherein said organic composition comprises at least one compound selected from the group consisting of primary and secondary amines having 1 to 18 carbon atoms and olefins having 2 to 18 carbon atoms.

28. The method of claim 16, wherein said hydride is an activated hydride, said gaseous organic composition comprises at least one compound selected from the group consisting of primary and secondary amines having 1 to 18 carbon atoms and olefins having 2 to 18 carbon atoms, and said hydride comprises at least one Group VIII element, and wherein said treating is performed at a temperature above about the boiling point and below about the critical point of said gaseous organic compound.

29. The method of claim 16, wherein said hydride is FeTi hydride, gaseous organic composition comprises at least one compound selected from the group consisting of primary and secondary amines having 1 to 8 carbon atoms.

30. The method of claim 16, wherein said hydride is LaNi$_5$ hydride, said gaseous organic composition comprises at least one compound selected from the group consisting of olefins having 2 to 8 carbon atoms and primary and secondary amines having 1 to 8 carbon atoms.

31. The method of claim 17, wherein said organic composition comprises at least one compound selected from the group consisting of primary and secondary amines having 1 to 18 carbon atoms and olefins having 2 to 18 carbon atoms.

32. The method of claim 18, wherein said hydride comprises at least one Group VIII element, said organic composition is a liquid and said treating is begun with said hydride in a substantially hydrided state, and wherein the treating of said hydride provides a treated hydride solution comprising said hydride and said liquid organic composition and wherein said hydride solution has a pH value that is below about 7.

33. The method of claim 19, wherein said hydride comprises at least one Group VIII element, said organic composition is a liquid and said treating is begun with said hydride in a substantially hydrided state, and wherein the treating of said hydride provides a treated hydride solution comprising said hydride and said liquid organic composition and wherein the pH of the treated hydride solution is below about 7.

34. The method of claim 20, wherein said hydride comprises at least one Group VIII element, said organic composition is a liquid and said treating is begun with said hydride in a substantially hydrided state, and wherein the treating of said hydride provides a treated hydride solution comprising said hydride and said liquid organic composition and wherein the pH of the treated hydride solution is below about 7.

35. The method of claim 21, wherein said hydride comprises at least one Group VIII element.

36. The method of claim 22, wherein said treating is begun with said hydride in a substantially hydrided state, and wherein said organic compound comprises at least one component having at least two carbon atoms and being selected from the group consisting of alcohols, organic acids, and organic acid salts.

37. The method of claim 27, wherein said organic composition comprises said amines, said amines having 1 to 8 carbon atoms.

38. The method of claim 31, wherein said hydride comprises at least one Group VIII element.

39. The method of claim 33, wherein said alcohols have 3 to 8 carbon atoms.

40. The method of claim 34, wherein said organic acids and organic acid salts have 2 to 8 carbon atoms.

41. The method of claim 36, wherein said hydride comprises at least one Group VIII element.

42. A method for improving flow properties of a hydrided metal hydride, said hydride being an alloy, a mixture, or an intermetallic compound, each consisting essentially of metals selected from Groups IIA, IIIA, IVB, VIB, VIIB, and VIII of the Periodic Table of Elements and being capable of reversibly absorbing and desorbing hydrogen, which method comprises: (a) activating said hydride by cycling at about room temperature through one or more absorption/desorption cycles between about 500 psia and about 5 psia of hydrogen; (b) treating said hydride in a hydrided state with a liquid organic composition capable of imparting improved flow properties to said hydride comprising at least one component selected from the group consisting of aliphatic hydrocarbons containing 1 to 18 carbon atoms, alcohols containing 1 to 18 carbon atoms, organic acids and organic acid salts containing 2 to 18 carbon atoms, in an amount approximately sufficient to form a monolayer coating of said compound on each particle of said hydride; (c) removing substantially all excess organic composition; (d) cycling said hydride through one or more absorption/desorption cycles between about 5 psia and about 500 psia of hydrogen at a temperature above the boiling point of said organic composition; (e) cooling said hydride under about 500 psia of hydrogen; and (f) reactivating said hydride by cycling at about room temperature through one or more absorption/desorption cycles between about 500 psia and about 5 psia of hydrogen.

43. The method of claim 42, wherein demineralized water is stirred into the hydride after activation of said hydride.

44. The method of claim 42, wherein said organic composition is substantially non-aqueous.

* * * * *